US012624785B2

(12) United States Patent
Lafond et al.

(10) Patent No.: US 12,624,785 B2
(45) Date of Patent: May 12, 2026

(54) SECURE BRAKE FLUID COUPLER

(71) Applicant: Danfoss A/S, Nordborg (DK)

(72) Inventors: Sébastien Lafond, Habere Lullin (FR); Bernard Mouchet, Machilly (FR)

(73) Assignee: Danfoss A/S, Nordborg (DK)

( * ) Notice: Subject to any disclaimer, the term of this patent is extended or adjusted under 35 U.S.C. 154(b) by 1 day.

(21) Appl. No.: 18/259,232

(22) PCT Filed: Dec. 22, 2021

(86) PCT No.: PCT/IB2021/062182
§ 371 (c)(1),
(2) Date: Jun. 23, 2023

(87) PCT Pub. No.: WO2022/137160
PCT Pub. Date: Jun. 30, 2022

(65) Prior Publication Data
US 2024/0318756 A1 Sep. 26, 2024

Related U.S. Application Data

(60) Provisional application No. 63/128,981, filed on Dec. 22, 2020.

(51) Int. Cl.
*F16L 37/088* (2006.01)
*F16L 37/34* (2006.01)
(Continued)

(52) U.S. Cl.
CPC ........... *F16L 37/0887* (2019.08); *F16L 37/34* (2013.01); *B60T 17/043* (2013.01); *B62D 65/12* (2013.01); *F16L 37/35* (2013.01)

(58) Field of Classification Search
CPC . F16L 37/34; F16L 37/35; F16L 37/32; F16L 37/0887; B60T 17/043
See application file for complete search history.

(56) References Cited

U.S. PATENT DOCUMENTS 2,837,352 A * 6/1958 Wurzburger ............ F16L 37/22
285/349
2,905,486 A * 9/1959 Goodin, Jr. ............. F16L 37/34
285/277
(Continued)

FOREIGN PATENT DOCUMENTS

CN 108884957 A 11/2018
DE 4323758 A1 4/1994
(Continued)

OTHER PUBLICATIONS

International Search Report and Written Opinion for PCT/IB2021/062182 dated Jun. 15, 2022.
(Continued)

*Primary Examiner* — David Colon-Morales
(74) *Attorney, Agent, or Firm* — Merchant & Gould P.C.

(57) ABSTRACT
The braking systems of motorized and motor-assisted vehicles can be quickly assembled within a factory with secure connections. Controls of the braking systems are connected to brakes of the braking system using a snap-fit connection without introducing air into the brake fluid line. Once assembled, the controls and the brakes are securely connected until deliberately released, thereby providing a safe and reliable connection during operation of the motorized or motor-assisted vehicles.

15 Claims, 9 Drawing Sheets

(51) Int. Cl.

| | |
|---|---|
| B60T 17/04 | (2006.01) |
| B62D 65/12 | (2006.01) |
| F16L 37/35 | (2006.01) |

(56) References Cited

U.S. PATENT DOCUMENTS

| | | | | |
|---|---|---|---|---|
| 2,958,544 | A * | 11/1960 | Wurzburger | F16L 37/34 137/614.03 |
| 3,039,794 | A * | 6/1962 | De Cenzo | F16L 37/34 285/317 |
| 3,120,968 | A * | 2/1964 | Calvin | F16L 37/34 285/321 |
| 3,380,476 | A * | 4/1968 | Torres | F16L 37/002 102/373 |
| 3,417,781 | A * | 12/1968 | Gregg | F16L 37/34 137/614.04 |
| 3,613,726 | A * | 10/1971 | Torres | F16L 37/23 285/86 |
| 4,815,495 | A * | 3/1989 | Remsburg | F16L 37/23 251/126 |
| 4,886,301 | A * | 12/1989 | Remsburg | F16L 37/56 285/39 |
| 4,906,031 | A * | 3/1990 | Vyse | F16L 37/084 285/305 |
| 4,991,627 | A * | 2/1991 | Nix | F16D 48/02 285/319 |
| 5,129,423 | A * | 7/1992 | Fournier | F16L 37/0985 137/322 |
| 5,215,122 | A * | 6/1993 | Rogers | F16L 29/04 251/149.6 |
| 5,226,682 | A * | 7/1993 | Marrison | F16L 37/0887 285/308 |
| 5,494,073 | A * | 2/1996 | Saito | F16L 37/34 251/149.6 |
| 5,546,984 | A * | 8/1996 | Arcaro | G03G 15/0886 137/614 |
| 5,553,895 | A * | 9/1996 | Karl | F16L 37/0887 285/308 |
| 5,570,910 | A * | 11/1996 | Highlen | F16L 37/0887 285/308 |
| 6,161,578 | A * | 12/2000 | Braun | F16L 37/35 137/614.04 |
| 6,237,631 | B1 * | 5/2001 | Giesler | F16L 37/23 251/149.6 |
| 6,305,721 | B1 * | 10/2001 | Heinrichs | B60T 17/043 285/308 |
| 6,371,443 | B1 * | 4/2002 | Imai | F16L 37/35 137/614.04 |
| 6,450,545 | B1 * | 9/2002 | LeMay | F16L 37/0982 285/316 |
| 6,494,494 | B2 * | 12/2002 | Vogel | F16L 37/0887 285/321 |
| 6,533,327 | B1 * | 3/2003 | Twardawski | F16L 37/14 285/321 |
| 6,557,824 | B1 * | 5/2003 | Jenski, Jr. | F16L 37/35 251/149.6 |
| 6,588,805 | B2 * | 7/2003 | Persohn | B60T 17/04 285/305 |
| 6,592,151 | B2 * | 7/2003 | Densel | F16L 37/0887 285/305 |
| 6,681,803 | B2 * | 1/2004 | Taneya | F16L 37/23 251/149.6 |
| 6,688,655 | B1 * | 2/2004 | Watanabe | F16L 37/0887 285/308 |
| 6,769,720 | B2 * | 8/2004 | Dahms | F16L 37/0887 285/308 |
| 6,866,064 | B2 * | 3/2005 | Nanni, Jr | F16L 37/0887 137/15.09 |
| 7,029,035 | B2 * | 4/2006 | Seymour, II | F16L 37/0982 285/308 |
| 7,213,845 | B2 * | 5/2007 | Sato | F16L 37/34 285/85 |
| 7,469,933 | B2 * | 12/2008 | Swift | F16L 37/0887 285/321 |
| 7,488,006 | B2 * | 2/2009 | Dahms | F16L 37/0887 285/305 |
| 7,543,854 | B2 * | 6/2009 | Dahms | F16L 37/0887 285/321 |
| 7,600,790 | B2 * | 10/2009 | Persohn | F16L 37/0887 285/39 |
| 7,832,774 | B2 * | 11/2010 | Densel | F16L 37/0842 285/308 |
| 8,196,606 | B2 * | 6/2012 | Kitagawa | F16L 37/34 251/149.6 |
| 8,469,406 | B2 * | 6/2013 | Takahashi | F16L 37/34 137/614.05 |
| 8,628,119 | B2 * | 1/2014 | Hasunuma | F16L 37/34 285/276 |
| 8,746,750 | B2 * | 6/2014 | Gilbreath | F16L 37/0887 285/321 |
| 8,813,782 | B2 * | 8/2014 | Becocci | F16L 37/35 137/614.04 |
| 9,080,712 | B2 * | 7/2015 | Tiberghien | F16L 37/23 |
| 9,709,199 | B2 * | 7/2017 | Laufer | F16L 37/34 |
| 10,190,713 | B2 * | 1/2019 | Tiberghien | F16L 37/32 |
| 11,105,453 | B2 * | 8/2021 | Imoto | F16L 37/28 |
| 11,428,359 | B2 * | 8/2022 | Tiberghien | F16L 37/22 |
| 11,486,528 | B2 * | 11/2022 | Nick | F16L 37/23 |
| 11,530,768 | B2 * | 12/2022 | Wada | F16L 37/32 |
| 11,655,924 | B2 * | 5/2023 | Ramaswamy | F16L 29/04 251/149.6 |
| 2005/0056325 | A1 * | 3/2005 | Becocci | B60T 17/043 137/614.04 |
| 2006/0273577 | A1 * | 12/2006 | Stewart | F16L 37/0887 285/39 |
| 2007/0025811 | A1 * | 2/2007 | Wilhelm | F16L 37/34 403/300 |
| 2007/0246108 | A1 * | 10/2007 | Conway | F16L 37/34 137/614.06 |
| 2009/0140519 | A1 * | 6/2009 | Pavnaskar | F16L 37/23 285/308 |
| 2010/0019490 | A1 * | 1/2010 | Udo | F16L 37/0887 285/332.2 |
| 2017/0307122 | A1 * | 10/2017 | Imoto | F16L 37/22 |

FOREIGN PATENT DOCUMENTS

| | | | | | |
|---|---|---|---|---|---|
| DE | 19932307 | A1 * | 1/2001 | | F16L 37/088 |
| DE | 10236059 | A1 * | 2/2004 | | F16L 37/34 |
| EP | 1514758 | A1 | 3/2005 | | |
| EP | 2431647 | A2 | 3/2012 | | |
| WO | WO-9902914 | A1 * | 1/1999 | | F16L 37/32 |
| WO | 2022031918 | A1 | 2/2022 | | |

OTHER PUBLICATIONS

Eaton, "The Evolution of the Flat Face Quick Disconnect Couplings puts the pressure on competition", copyright 2017.

Eaton, "Quick Disconnect Couplings Master Catalog", Aug. 2017.

CN Office Action dated Oct. 1, 2025 from Corresponding CN Appln. 202180094049.6 w/translation (10 pages).

* cited by examiner

SECURE BRAKE FLUID COUPLER

CROSS REFERENCE TO RELATED APPLICATION

This application is a National Stage Application of PCT/IB2021/062182 filed Dec. 22, 2021, which claims the benefit of and priority to U.S. Provisional Application No. 63/128,981, filed Dec. 22, 2020, which applications are hereby incorporated herein by reference. To the extent appropriate, a claim of priority is made to each of the above-disclosed applications.

BACKGROUND

Motor vehicles—such as cars, motorcycles, and buses—and motor-assisted vehicles—such as electric drive bicycles (hereinafter "e-bikes")—enable a user to travel quickly for sustained periods with little effort. Such vehicles use robust braking systems, such as hydraulic braking systems, to slow momentum of the vehicle. Improvements are desired.

SUMMARY

Some aspects of the disclosure are directed to quickly assembling a robust braking arrangement on a motorized or motor-assisted vehicle. For example, certain aspects of the disclosure are directed to quickly assembling a brake actuator with a brake control on an assembly line without needing to bleed a corresponding brake fluid line.

Other aspects of the disclosure are directed to a coupling arrangement allowing for quick connect, but prohibiting quick disconnect. In certain implementations, the coupling arrangement includes a plug connector that mates with a socket connector. In certain implementations, the plug and socket connectors mate together without introducing air, liquid, or other contaminants from an exterior of the coupling arrangement into a joined fluid line.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 1 is schematic diagram showing two portions of a brake assembly disposed at an assembly line station for connection thereof;

FIG. 13 is a cross-sectional view of another example design for a coupling arrangement including socket and plug connectors with alternative seal arrangements.

DETAILED DESCRIPTION

Figure 2:
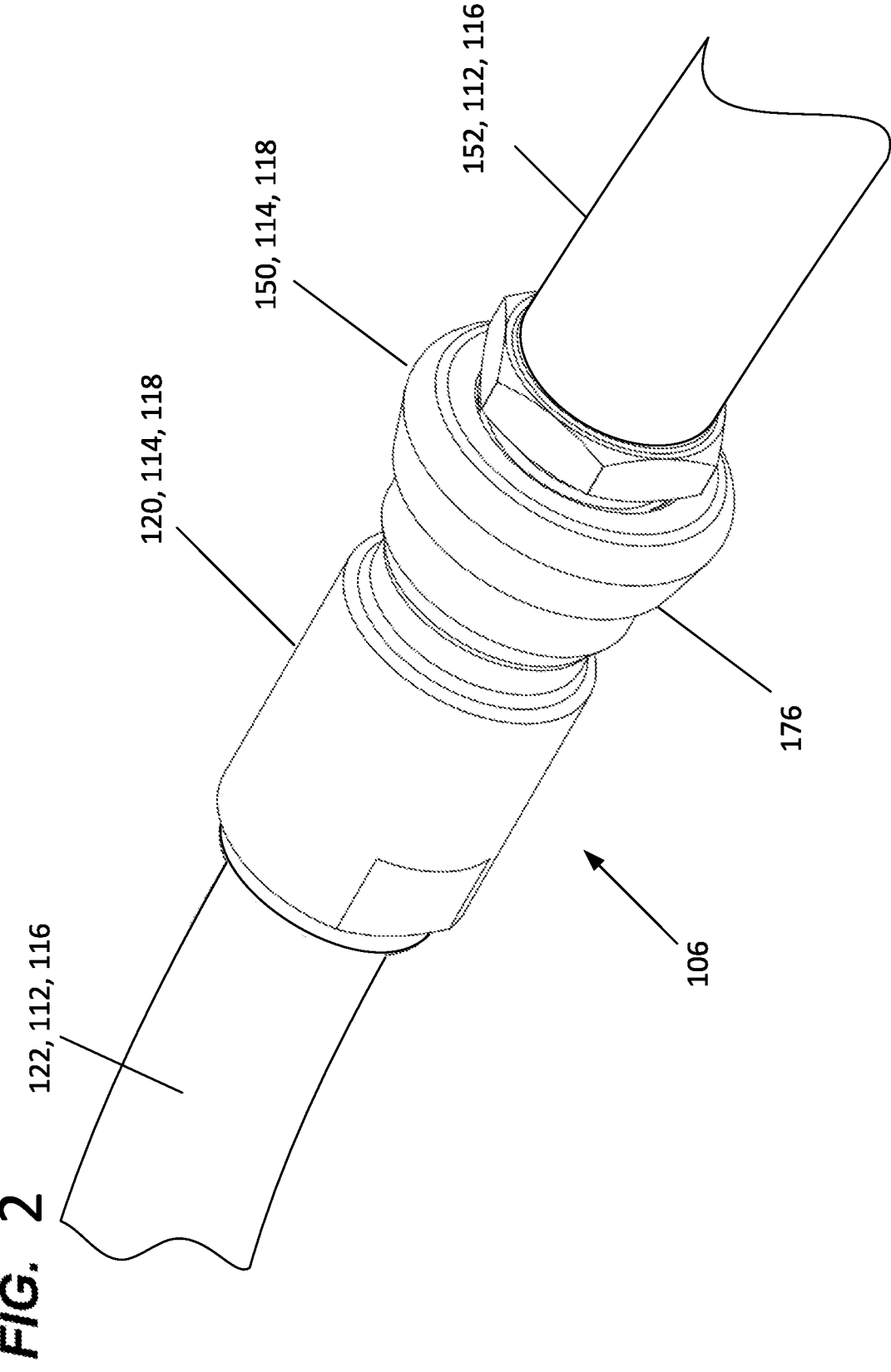
FIG. 2 is a perspective view of an example coupling arrangement by which the two portions of the brake assembly of FIG. 1 can be connected, the coupling arrangement including a socket connector and a plug connector.
Figure 3:
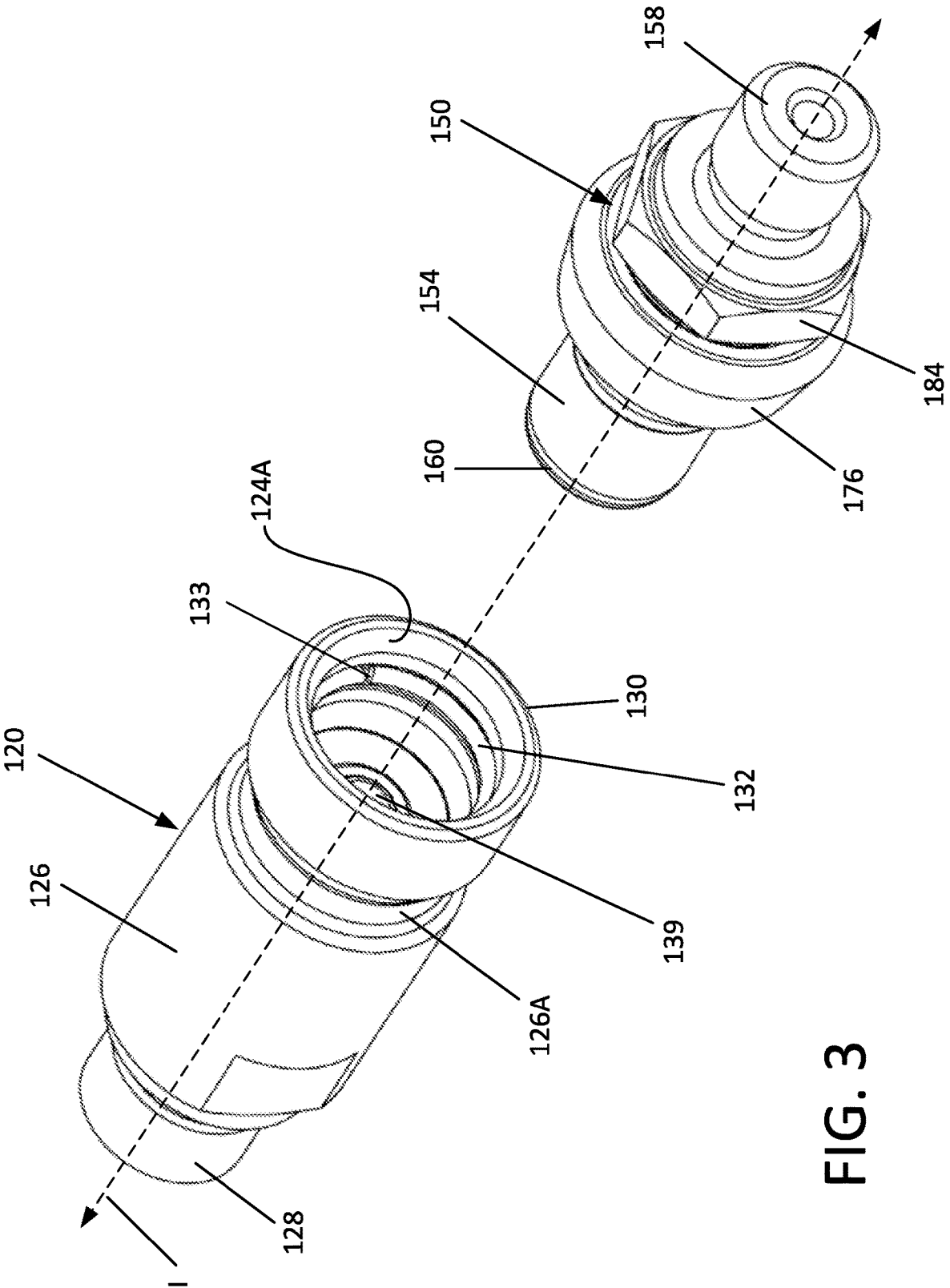
FIG. 3 is a perspective view of the coupling arrangement of FIG. 2 showing the plug connector spaced from the socket connector.
Figure 4:
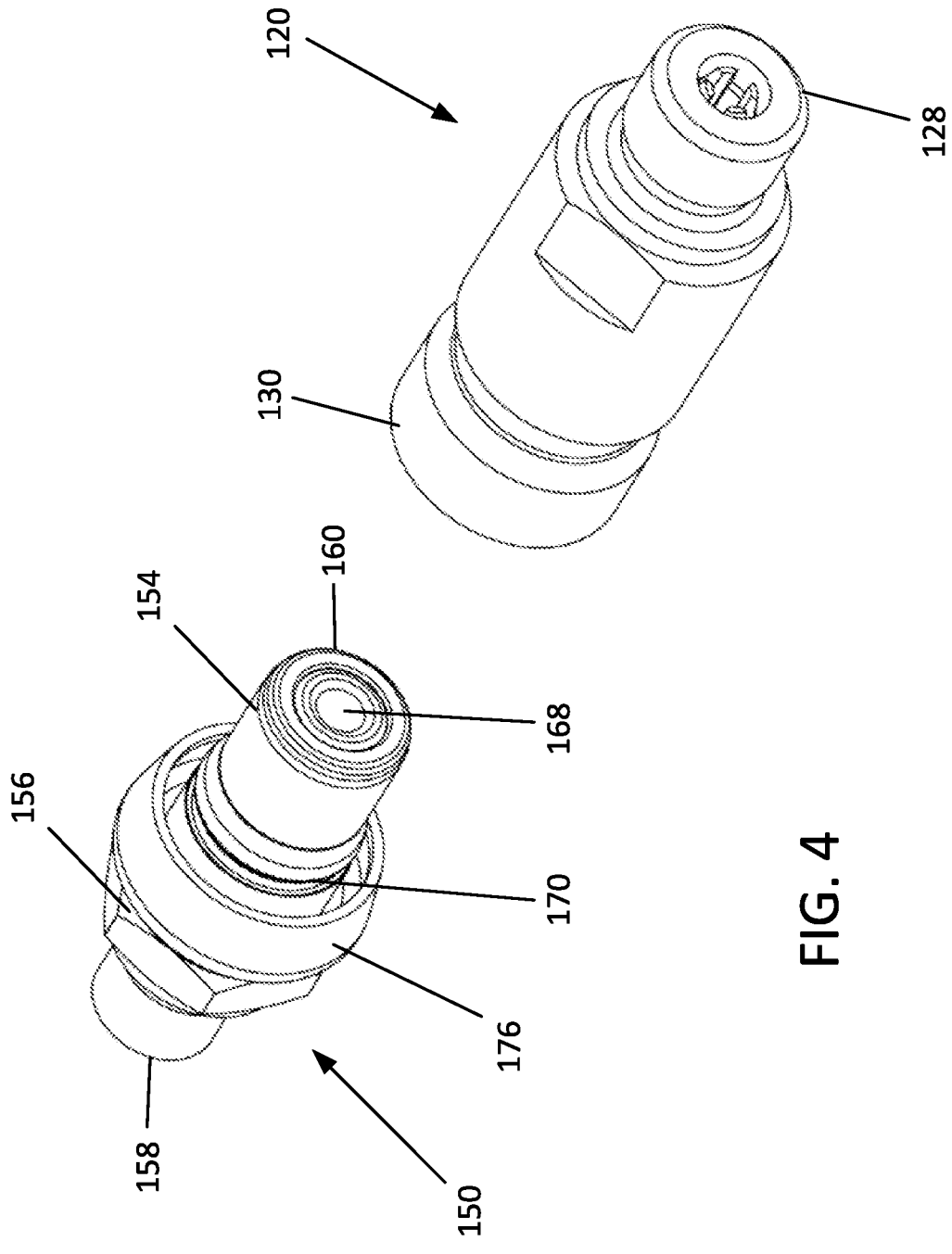
FIG. 4 is another perspective view of the coupling arrangement of FIG. 3.

Reference will now be made in detail to exemplary aspects of the present disclosure that are illustrated in the accompanying drawings. Wherever possible, the same reference numbers will be used throughout the drawings to refer to the same or like parts.

The present disclosure is directed to a coupling arrangement for hydraulic lines. The coupling arrangement includes a plug connector terminating a first hydraulic line and a socket connector terminating a second hydraulic line. The plug and socket connectors can be quickly and easily secured together to form a combined hydraulic line. In certain implementations, the connection between the plug and socket connectors is sufficiently secure to inhibit disconnection without the use of a separate tool. In certain implementations, the plug connector and the socket connector secure together without introducing air into the combined hydraulic line.

Figure 1:
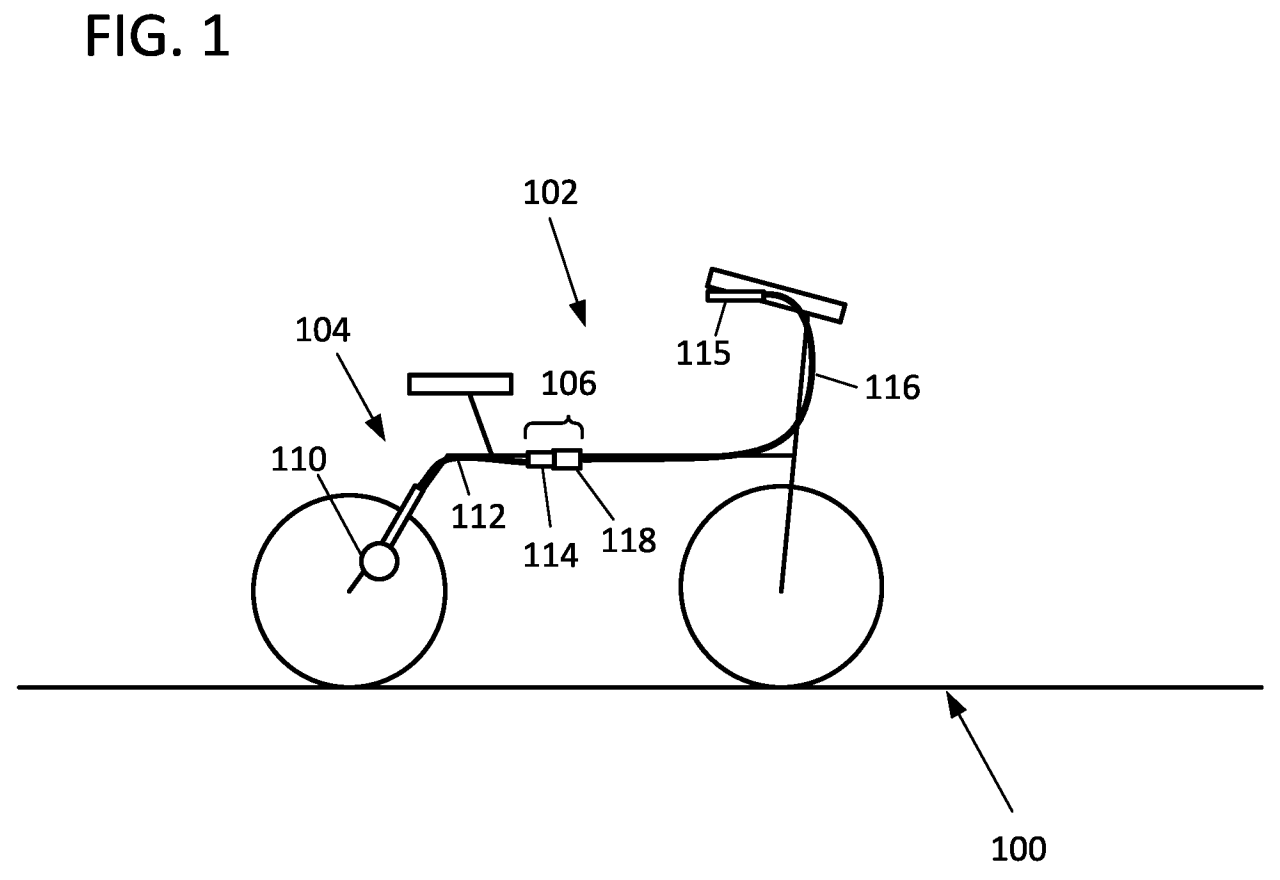

Referring to FIG. 1, configuring a coupling arrangement 106 for a quick and easy connection facilitates use of the coupling arrangement at a station 100 on an assembly line. Accordingly, the coupling arrangement 106 facilitates the efficient assembly of a hydraulic arrangement, such as a brake arrangement 104 for a motorized or motor-assisted vehicle, at the assembly line station 100. Configuring the coupling arrangement 106 to inhibit disconnection enhances the safety and reliability of the connection. Accordingly, the coupling arrangement 106 provides a secure connection suitable for use in a brake arrangement 104 of a motorized or motor-assisted vehicle.

In the example shown in FIG. 1, the assembly line is configured to manufacture an e-bike 102. In other implementations, the assembly line is used to manufacture other motor-assisted vehicles (e.g., scooters) or motorized vehicles (e.g., cars, motorcycles, trucks, buses, aircraft, etc.).

In the example shown in FIG. 1, a brake 110 (e.g., a brake disc) of the brake arrangement 104 is mounted to the e-bike 102 (e.g., to a rear wheel of the e-bike). A first hydraulic line 112 extends from the brake 110 to a first component 114 (e.g., one of the plug connector and the socket connector) of the coupling arrangement 106. Brake controls 115 (e.g., a brake lever) is mounted to the handlebar of the e-bike 102. A second hydraulic line 116 extends from the brake controls 115 to a second component 118 (e.g., the other of the plug connector and the socket connector) of the coupling arrangement 106. At the assembly line station 100, the first component 114 is secured to the second component 118 to fluidly couple the brake lines 112, 116, thereby connecting the brake 110 to the brake controls.

In certain implementations, the coupling arrangement 106 can be disposed within a hollow section of a frame of the e-bike 102 or other vehicle. In the example shown, the coupling arrangement 106 is disposed at a middle portion of the frame. In other examples, however, the coupling arrangement 106 can be disposed at any desired location on the frame (e.g., at the rear wheel, at the handlebar, etc.). In still other implementations, the coupling arrangement 106 can hydraulically connect any desired components.

In certain implementations, the coupling assembly 106 is configured to enable the first and second hydraulic lines 112, 116 to be pre-filled with hydraulic fluid prior to connection of the components 114, 118 of the coupling assembly 106 at the assembly line station 100. Accordingly, the brake 110 can be installed at the rear wheel (or elsewhere) and the brake line 112 filled prior to reaching the assembly station 100 shown in FIG. 1. Likewise, the brake controls 115 can be installed at the handlebars (or elsewhere) and the brake line 116 filled prior to reaching the assembly station 100. In other examples, the brake 110 and/or brake controls can be installed at the station 100. Further, one or both hydraulic lines 112, 116 can be filled with hydraulic fluid at the station 100.

In certain implementations, the first and second connection components 114, 118 are configured to secure together without introducing air into the combined hydraulic line. Accordingly, the brake controls can be hydraulically coupled to the brake 110 without needing to bleed the combined brake line after assembly. Eliminating the need to bleed the brake line speeds up the assembly process and reduces waste of hydraulic fluid.

FIGS. 2-5 show an example implementation of a coupling assembly 106 suitable for use in connecting hydraulic lines, such as brake fluid lines 112, 116. The coupling assembly 106 includes a socket connector 120 terminating a first hydraulic line 122 (e.g., either one of hydraulic lines 112 and 116) and a plug connector 150 terminating a second hydraulic line 152 (e.g., the other of hydraulic lines 112 and 116). The socket connector 120 defines a cavity 124 accessible through a port opening 124A. A nose 154 of the plug connector 150 is configured to enter the cavity 124 through the port opening 124A.

Referring back to FIG. 1, the first component 114 of the coupling assembly 106 can be implemented as either one of the socket connector 120 and the plug connector 150. The second component 118 of the coupling assembly 106 can be implemented as the other of the socket connector 120 and the plug connector 150.

As shown in FIGS. 2-5, the socket connector 120 includes a body 126 extending along a length between a first end 128 and a second end 130. The body 126 may include one or more features that facilitate mounting the body 126 to a surface or structure. For example, in FIG. 3, the body 126 defines a groove 126A at which the connector body 126 can be mounted (e.g., clamped) to a structure.

The first end 128 of the body 126 is sized to receive a tube defining the first hydraulic line 122. For example, the tube may mount over and be crimped, clamped, or otherwise secured to the first end 128 of the body 126. The body 126 also defines a passage 125 extending into the body 126 from the first end 128 to continue the first fluid line 122 into the cavity 124 of the socket connector 120. The body 126 provides access to the cavity 124 at the second end 130 through the port opening 124A. The end of the passage 125 is accessible within the cavity 124.

Figure 5:
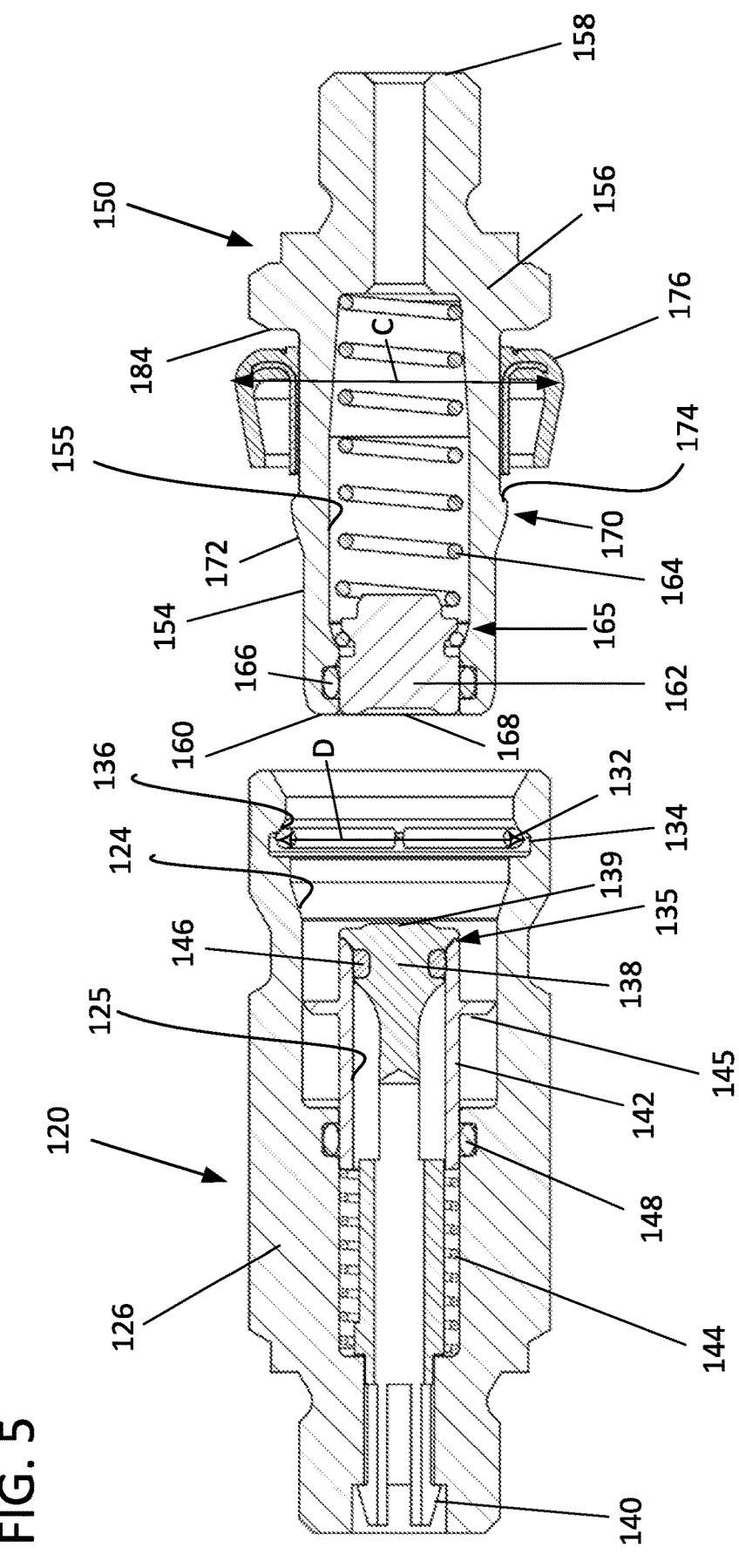
FIG. 5 is a cross-sectional view of the socket connector and the plug connector of FIG. 2 shown in a disconnected state.

A first valve arrangement 135 is disposed within the body 126 at the end of the passage 125 (e.g., see FIG. 5). The first valve arrangement 135 can be transitioned between a closed configuration and an open configuration. When in the closed configuration, the first valve arrangement 135 fluidly seals the passage 125. When in the open configuration, the first valve arrangement 135 opens the passage 125 to fluid flow. The first valve arrangement 135 includes a valve stem 138 and a valve sleeve 142 that moves relative to the valve stem 138. In certain examples, the valve stem 138 is fixed relative to the connector body 126 (e.g., by a collet 140, a clamp, a latch, adhesive, welding, etc.) and the valve sleeve 142 slides within the connector body 126 relative to the valve stem 138. In certain implementations, the valve sleeve 142 is spring-biased to the closed configuration with spring 144.

The valve stem 138 carries a first seal 146 (e.g., an o-ring, other gasket, or sealing lip monolithically formed with the valve stem 138) that inhibits fluid flow when radially compressed between the valve stem 138 and the valve sleeve 142. The valve sleeve 142 engages the first seal 146 (e.g., to radially compress the first seal 146) when disposed in the closed configuration. The valve sleeve 142 being spaced from the first seal 146 when disposed in the open configuration. In certain implementations, the body 126 also carries a second seal 148 (e.g., an o-ring or other gasket) spaced from the first seal 146 towards the first end 128 of the body 126. The second seal 148 inhibits fluid flow when radially compressed between the body 126 and the valve sleeve 142.

The plug connector 150 includes a body 156 extending along a length between a first end 158 and a second end 160. The first end 158 of the body 156 is sized to receive a tube defining the second hydraulic line 152. For example, the tube may mount over and be crimped, clamped, or otherwise secured to the first end 158 of the body 156. The body 156 also defines a passage 155 extending into the body 156 from the first end 158 to continue the second fluid line 152 through the plug connector 150 to an interface aperture at the second end 160. The body 156 carries a seal 166 (e.g., an o-ring or other gasket) that inhibits fluid flow when radially compressed between the body 156 and a second valve arrangement 165.

The second valve arrangement 165 is disposed within the body 156 at the interface aperture to selectively engage and disengage the seal 166. The second valve arrangement 165 can be transitioned between a closed configuration and an open configuration. When in the closed configuration, the second valve arrangement 165 fluidly seals the interface aperture, thereby closing passage 155. When in the open configuration, the second valve arrangement 165 allows fluid access to the passage 155 through the interface aperture. In certain implementations, the second valve arrangement 165 includes a valve stopper 162 that is movable within the body 156. In certain examples, the valve stopper 162 slides within the passage 155. In certain examples, the valve stopper 162 is spring-biased to the closed configuration with spring 164.

Figure 9:
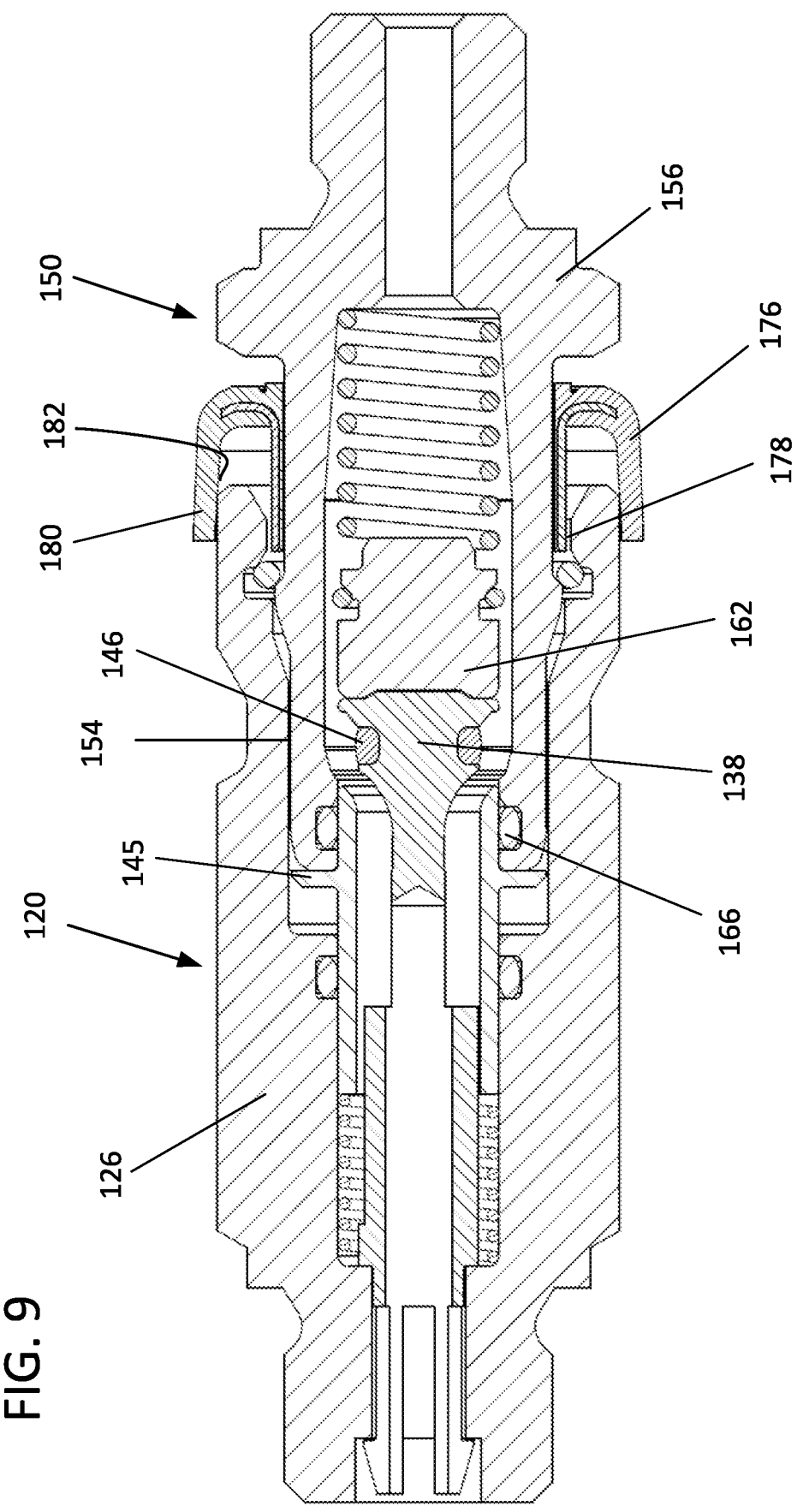
FIG. 9 is a cross-sectional view of the coupling arrangement of FIG. 2.

As shown in FIG. 9, engagement between the plug connector 150 and the socket connector 120 transitions the first and second valve arrangements 135, 165 from the closed configurations to the open configurations to form a joined fluid passage through the coupling arrangement 106. In certain implementations, the valve arrangements 135, 165 are not transitioned to the open configurations until the passage 155 of the plug connector 150 is sealed to the passage 125 of the socket connector 120. Accordingly, the plug and socket connectors 150, 120 can be connected and the passages 155, 125 fluidly coupled without introducing air, liquid, or other contaminants into the joined passage. Advantageously, coupling the passages 155, 125 without introducing air mitigates or eliminates the need to subsequently bleed the combined passage, which reduces manufacturing time, enhances efficiency, and reduces waste of hydraulic fluid.

During connection of the coupler arrangement 106, the nose 154 of the plug connector 150 enters the cavity 124 of the socket connector 120 through the port opening 124A. As the plug connector 150 moves into the cavity 124, an interface surface 139 of the first valve arrangement 135 abuts an interface surface 168 of the second valve arrangement 165. In certain examples, the interface surfaces 139, 168 are complementary (e.g., one forms a depression sized and shaped to fit a protrusion of the continued insertion of the plug connector 150 causes the valve stem 138 to push the valve stopper other). Accordingly, air does not become trapped between the interface surfaces 139, 168. In certain implementations, the valve stem 138 forms the first interface surface 139 and the valve stopper 162 forms the second interface surface 168.

Because the valve stem 138 is fixed relative to the body 126, 162 towards the open configuration of the second valve arrangement 165. As the valve stopper 162 moves towards the open configuration, an external surface of the valve stopper 162 slides across the seal 166. As the external surface of the valve stopper 162 disengages the seal 166, the seal 166 engages an external surface of the valve sleeve 142 of the first valve arrangement 135. Accordingly, the second passage 155 remains environmentally sealed.

The plug connector 150 continues to be inserted, thereby causing the second end 160 of the plug connector 150 to abut a radial flange 145 of the valve sleeve 142 while the seal 166 engages an exterior of the valve sleeve 142. The second end 160 of the plug connector 150 pushes against the radial flange 145 to move the valve sleeve 142 against the bias of the spring 144 to transition the first valve arrangement 135 towards the open configuration. Because the seal 166 is engaged to the exterior of the valve sleeve 142, disengagement between the valve sleeve 142 and the seal 146 does not expose the first passage 155 to contamination (e.g., air, water, dirt, etc.).

Referring back to FIGS. 3-5, in certain implementations, the socket connector 120 and the plug connector 150 cooperate to define a securement arrangement that locks the coupling arrangement 106 against disconnection absent an active release of the lock. In certain implementations, the plug connector 150, once connected to the socket connector 120, cannot be released from the socket connector 120 without the use of a separate tool. Accordingly, the securement arrangement provides a semi-permanent connection between the plug connector 150 and the socket connector 120.

In certain implementations, the socket connector 120 and the plug connector 150 each define a portion of a locking arrangement that secures the socket and plug connectors 120, 150 together. In certain examples, the locking arrangement automatically actuates (e.g., securely connects) when the plug connector 150 is pushed sufficiently far into the socket connector 120. For example, in certain implementations, the user need take no further action beyond pushing the plug connector 150 into the socket connector 120 a predetermined distance to lock the plug connector 150 to the socket connector 120.

In certain implementations, the plug connector 150 carries a release sleeve 176 that enables the plug connector 150 to disengage from the socket connector 120. For example, the release sleeve 176 may be slidable or deformable relative to the plug body 156 between a neutral position and a release position. When in the neutral position, the release sleeve 176 does not interact with the locking arrangement. When in the release position, the release sleeve 176 deactuates the locking arrangement.

In some implementations, the release sleeve 176 may be manually actuated (e.g., moved from the neutral position to the release position). In other implementations, the release sleeve 176 is sized and/or shaped to inhibit manual actuation. For example, the release sleeve 176 may be sized tight to the outer dimensions of the plug connector 150 to make grasping of the release sleeve 176 difficult, thereby inhibiting manual actuation. In certain examples, the release sleeve 176 may be sized tight to the outer dimensions of the socket connector 120. In some examples, tight sizing may increase friction between the release sleeve 176 and the socket body 126 during movement of the release sleeve 176. In other examples, tight sizing may require flexing of the release sleeve 176 to clear the socket connector body 126. Accordingly, in certain examples, tight sizing may inhibit sliding of the release sleeve 176 absent the application of a confirmation force—an amount of force unlikely to be supplied unintentionally.

In certain implementations, the release sleeve 176 has an outermost cross-dimension C (FIG. 5) that extends no more than 30% beyond an outermost cross-dimension of the plug body 156. In certain implementations, the release sleeve 176 has an outermost cross-dimension C that extends no more than 20% beyond an outermost cross-dimension of the plug body 156. In certain implementations, the release sleeve 176 has an outermost cross-dimension C that extends no more than 10% beyond an outermost cross-dimension of the plug body 156. In certain implementations, the release sleeve 176 has an outermost cross-dimension C that extends no more than 5% beyond an outermost cross-dimension of the plug body 156. In certain implementations, the release sleeve 176 has an outermost cross-dimension C that extends no more than 2% beyond an outermost cross-dimension of the plug body 156.

In certain implementations, the release sleeve 176 has an outermost cross-dimension C (FIG. 5) that extends no more than 60% beyond a cross-dimension of the second end 160 of the plug body 156. In certain implementations, the release sleeve 176 has an outermost cross-dimension C that extends no more than 55% beyond a cross-dimension of the second end 160 of the plug body 156. In certain implementations, the release sleeve 176 has an outermost cross-dimension C that extends no more than 50% beyond a cross-dimension of the second end 160 of the plug body 156. In certain implementations, the release sleeve 176 has an outermost cross-dimension C that extends no more than 45% beyond a cross-dimension of the second end 160 of the plug body 156. In certain implementations, the release sleeve 176 has an outermost cross-dimension C that extends no more than 40% beyond a cross-dimension of the second end 160 of the plug body 156.

In certain implementations, the release sleeve 176 has an outermost cross-dimension C (FIG. 5) that is no more than 25 mm greater than an outer cross-dimension of the socket body 126 at the port 124A. In certain implementations, the release sleeve 176 has an outermost cross-dimension C that is no more than 20 mm greater than an outer cross-dimension of the socket body 126 at the port 124A. In certain implementations, the release sleeve 176 has an outermost cross-dimension C that is no more than 15 mm greater than an outer cross-dimension of the socket body 126 at the port 124A. In certain implementations, the release sleeve 176 has an outermost cross-dimension C that is no more than 10 mm greater than an outer cross-dimension of the socket body 126 at the port 124A. In certain implementations, the release sleeve 176 has an outermost cross-dimension C that is no more than 5 mm greater than an outer cross-dimension of the socket body 126 at the port 124A.

In some implementations, the locking arrangement includes a latch. In certain implementations, the locking arrangement includes an exterior feature of the plug connector 150 that engages an interior feature of the socket connector 120. In certain implementations, the locking arrangement includes a stop member 170 that interacts with a latch ring 132. In certain implementations, the release sleeve 176 engages and entrains one of the exterior and interior features (e.g., the latch ring 132) when moved relative to the plug body 156. Accordingly, the release sleeve 176 moves the entrained feature relative to the other locking arrangement feature to disengage the locking arrangement.

In the example depicted in FIGS. 5-8, the socket connector 120 carries a latch ring 132 within the cavity 124. In certain examples, the latch ring 132 is disposed axially between the first valve arrangement 135 and the port 124A. The latch ring 132 is resilient so that the latch ring 132 can be flexed or deformed from an unflexed configuration to an enlarged configuration where a cross-dimension (e.g., diameter) D of the latch ring is increased relative to the unflexed configuration. In certain examples, the latch ring 132 includes a metal ring interrupted by a slit 133 (FIG. 3) to enable outward flexing of the ring 132. Absent continued application of a flexing or deforming force, the latch ring 132 returns to the unflexed configuration.

The socket body 126 defines an internal annular groove 134 sized to accommodate the latch ring 132 when the latch ring 132 is enlarged. The groove 134 has an inner shoulder sized to inhibit movement of the latch ring 132 towards the first valve arrangement 135. The groove 134 has an outer shoulder sized to inhibit movement of the latch ring 132 towards the port 124A when the latch ring 132 is enlarged and to allow movement of the latch ring 132 towards the port 124A when the latch ring 132 is not enlarged.

The socket body 126 also defines an abutment surface 136 that tapers inwardly as the abutment surface 136 extends from the internal groove 134 towards the port 124A. In certain examples, the abutment surface 136 is an annular surface disposed between the annular groove 134 and the port 124A. The portion of the abutment surface 136 closest to the port 124A has an internal cross-dimension (e.g., diameter) that is smaller than the initial diameter D of the latch ring 132. Accordingly, the latch ring 132 is maintained within the cavity 124 of the socket connector 120 between the inner shoulder of the groove 134 and the abutment surface 136.

The plug body 156 includes an exterior stop feature 170 sized and shaped to interact with the latch ring 132 of the socket connector 120. In certain implementations, the stop feature 170 includes a camming surface 172 and an abutment surface 174. The camming surface 172 faces partially outwardly from the plug body 156 and partially towards the second end 160 of the plug body 156. The abutment surface 174 faces at least partially towards the first end 158 of the plug body 156. In certain examples, the abutment surface 174 has a steeper slope than the camming surface 172. In an example, the abutment surface 174 extends transversely outwardly from the plug body 156. In the example shown the abutment surface 174 is angled less than 90 degrees relative to an outer surface of the plug body 156.

Figure 6:
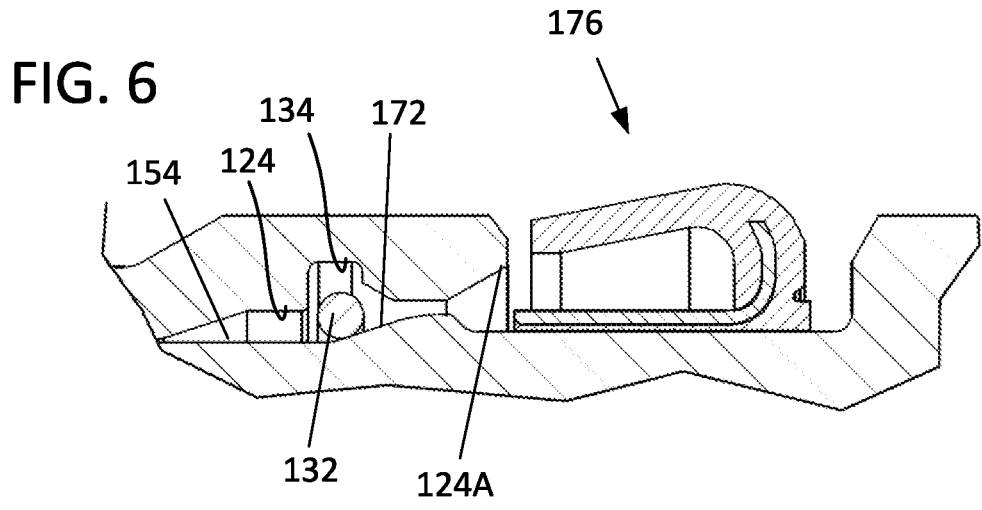
FIGS. 6-8 are enlarged views of a portion of FIG. 5 showing a progression of a stop feature of the plug connector through a latch ring of the socket connector during insertion of the plug connector into the socket connector.
Figure 7:
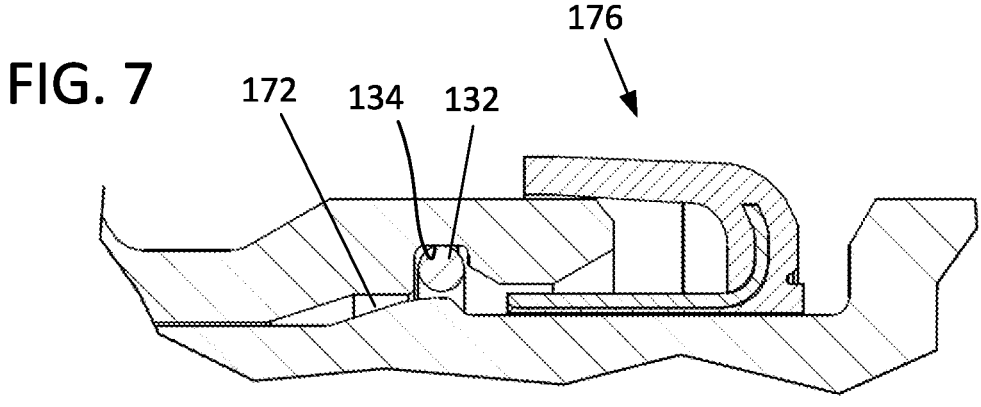
Figure 8:
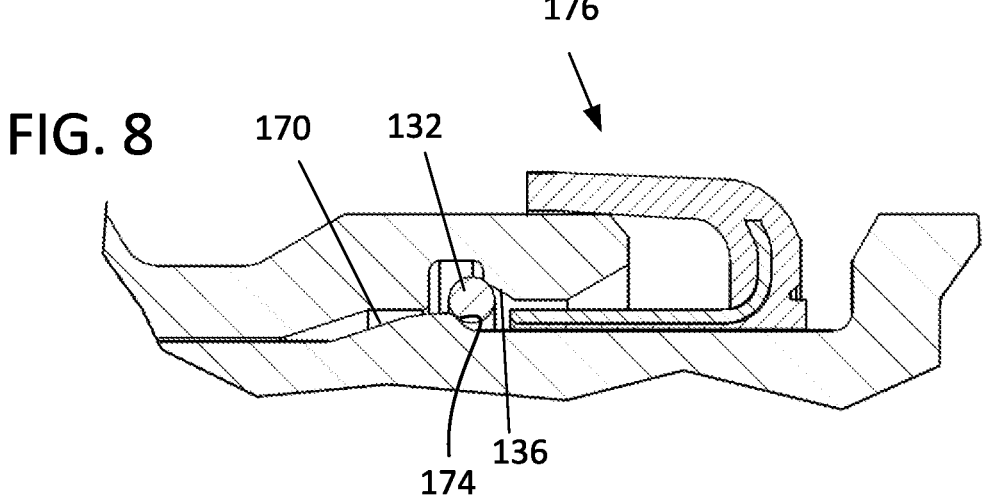

Referring to FIGS. 6-8, as the plug connector 150 is inserted into the socket connector 120, the exterior stop feature 170 is slid towards the latch ring 132. As the stop feature 170 slides past the latch ring 132, the latch ring 132 flexes or deforms to the enlarged configuration to ride over the camming surface 172. The latch ring 132 expands into the internal groove 134 to accommodate the expansion sufficient to enable the stop feature 170 to pass through the latch ring 132 (e.g., see FIG. 7). When the stop feature 170 has cleared the latch ring 132, the latch ring 132 returns to the unflexed configuration. The abutting surface 174 is angled such that the latch ring 132 does not cam over the abutting surface 174 into the groove 134 upon attempts to remove the plug connector 150. Rather, the latch ring 132 becomes sandwiched between the abutting surface 174 of the stop feature 170 and the abutting surface 136 of the socket connector body 126 (e.g., see FIG. 8). Accordingly, the latch ring 132 securely holds the plug connector 150 in the socket connector 120 against force in the removal direction.

Referring back to FIGS. 3-5, the release sleeve 176 is disposed along an intermediate portion of the plug connector body 156 between the stop feature 170 and the first end 158 of the plug body 156. In the example shown, the release sleeve 176 is disposed at about a longitudinal midpoint of the plug connector body 156. In the example shown, the release sleeve 176 is disposed between the stop feature 170 and a radial flange 184 that extends outwardly from the plug connector body 156. The release sleeve 176 is offset from the stop feature 170 towards the radial flange 184 so that a distal end of the release sleeve 176 is spaced from the abutting surface 174 of the stop feature 170.

The release sleeve 176 is slidable or deformable to move relative to the plug connector body 156 along the insertion axis I. The release sleeve 176 includes an inner portion 178 that extends along the exterior of the plug connector body 156 and an outer portion 180 that is radially spaced from the inner portion 178. In certain implementations, the inner portion 178 of the release sleeve 176 is formed of a different material than the outer portion 180. In other implementations, the inner and outer portions 178, 180 are formed of a common material. In certain examples, the inner and outer portions 178, 1780 are manufactures separately and then assembled as a release sleeve 176.

The inner and outer portions 178, 180 cooperate to define a pocket 182 within the release sleeve 176. For example, the outer portion 180 may extends (e.g., curve) away from the plug connector body 156 and then towards the second end 160 of the plug connector body 156 to form the pocket 182. The pocket 182 of the release sleeve 176 faces away from the radial flange 184. As shown in FIGS. 8 and 9, when the plug connector 150 is received at the socket connector 120, the inner portion 178 of the release sleeve 176 extends into the port 124A of the socket connector 120. The second end 130 of the socket connector 120 extends into the pocket 182. The outer portion 182 extends over second end 130 of the socket connector and partially along an exterior of the socket connector 120. Accordingly, the outer portion 182 of the release sleeve 176 inhibits access to the port 124A. Advantageously, the release sleeve 176 inhibits access to the latch ring 132, thereby mitigating disengagement of the latch ring 132 from the stop feature 170. In certain examples, the release sleeve 176 also may inhibit dust and/or water intrusion into the locking mechanism.

Figure 10:
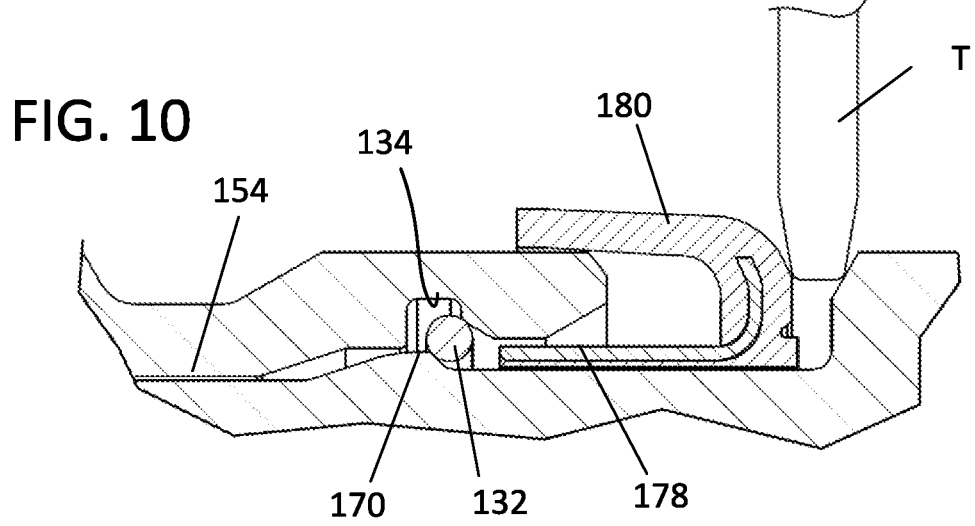
FIGS. 10-12 are enlarged views of a portion of FIG. 9 showing a progression of the release sleeve and stop feature relative to the latch ring during removal of the plug connector from the socket connector.
Figure 11:
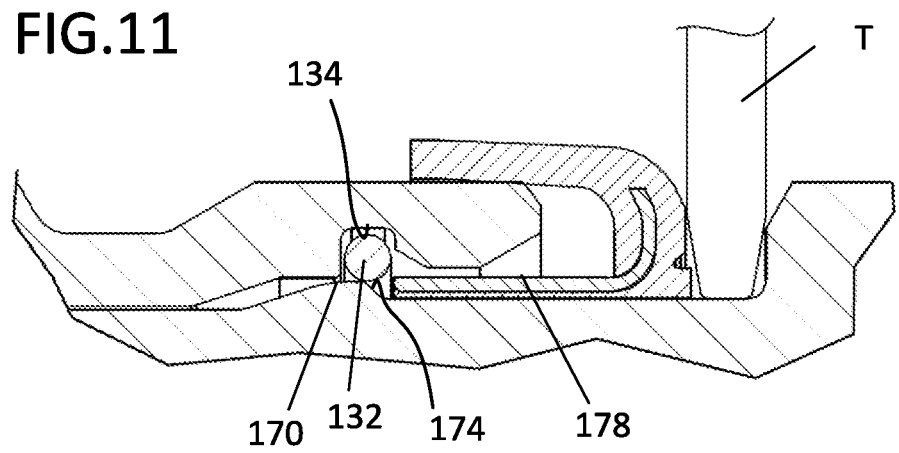
Figure 12:
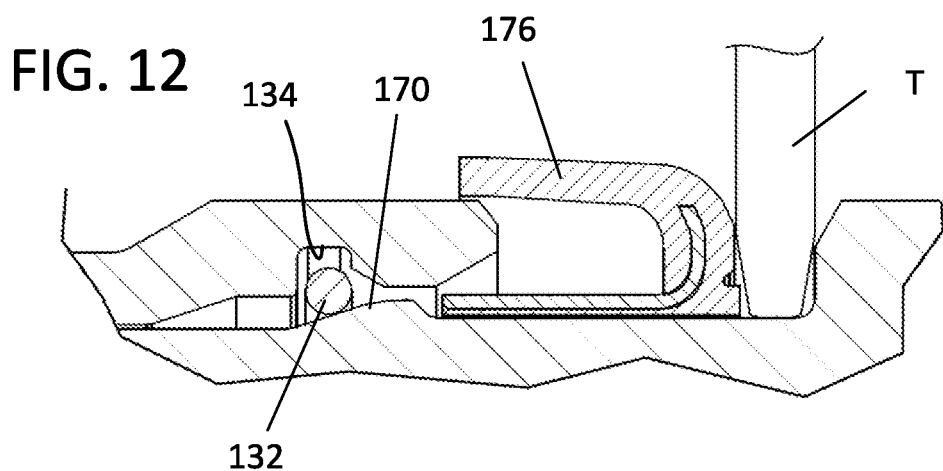

FIGS. 10-12 illustrate how the coupling arrangement 106 can be disconnected using a tool T. The tool T is inserted between the outer portion 180 of the release sleeve 176 and the radial flange 184. In certain implementations, the tool T is forked to fit around the connector body 156 between the release sleeve 176 and the radial flange 184. In other implementations, the tool T can be any desired shape. In certain examples, the tip of the tool T can be wedge-shaped to facilitate insertion between the release sleeve 176 and the flange 184.

When the tool T has been inserted, a user may use the tool T to move the release sleeve 176 along the insertion axis I from the neutral position to the release position. Moving the release sleeve 176 to the release position (e.g., in a direction away from the flange 184) moves the inner portion 178 of the release sleeve 176 towards the latch ring 132 within the socket connector cavity 124. In some implementations, the tool T slides the release sleeve 176 (or at least the inner portion 178) towards the socket connector 120 (e.g., see FIG. 11). In other implementations, the tool T deforms the release sleeve 176 so that the inner portion 178 extends further into the cavity 124 of the socket connector 120 towards the latch ring 132.

When the release sleeve 176 is moved to the release position, the inner portion 178 of the release sleeve 176 engages and pushes the latch ring 132 over the abutment surface 174 of the stop feature 170 of the plug connector 150, thereby enlarging the latch ring 132. The release sleeve 176 pushes the latch ring 132 into the annular groove 134 (e.g., see FIG. 11). Moving the latch ring 132 into the groove 134 enables the latch ring 132 to enlarge sufficient to enable the stop feature 170 to clear the latch ring 132 when the plug connector 150 is pulled out of the socket connector 120. When the latch ring 132 has cleared the apex of the stop feature 170, the latch ring 132 can transition back to the unflexed state as it rides down the camming surface 172 (e.g., see FIG. 12).

Figure 13:
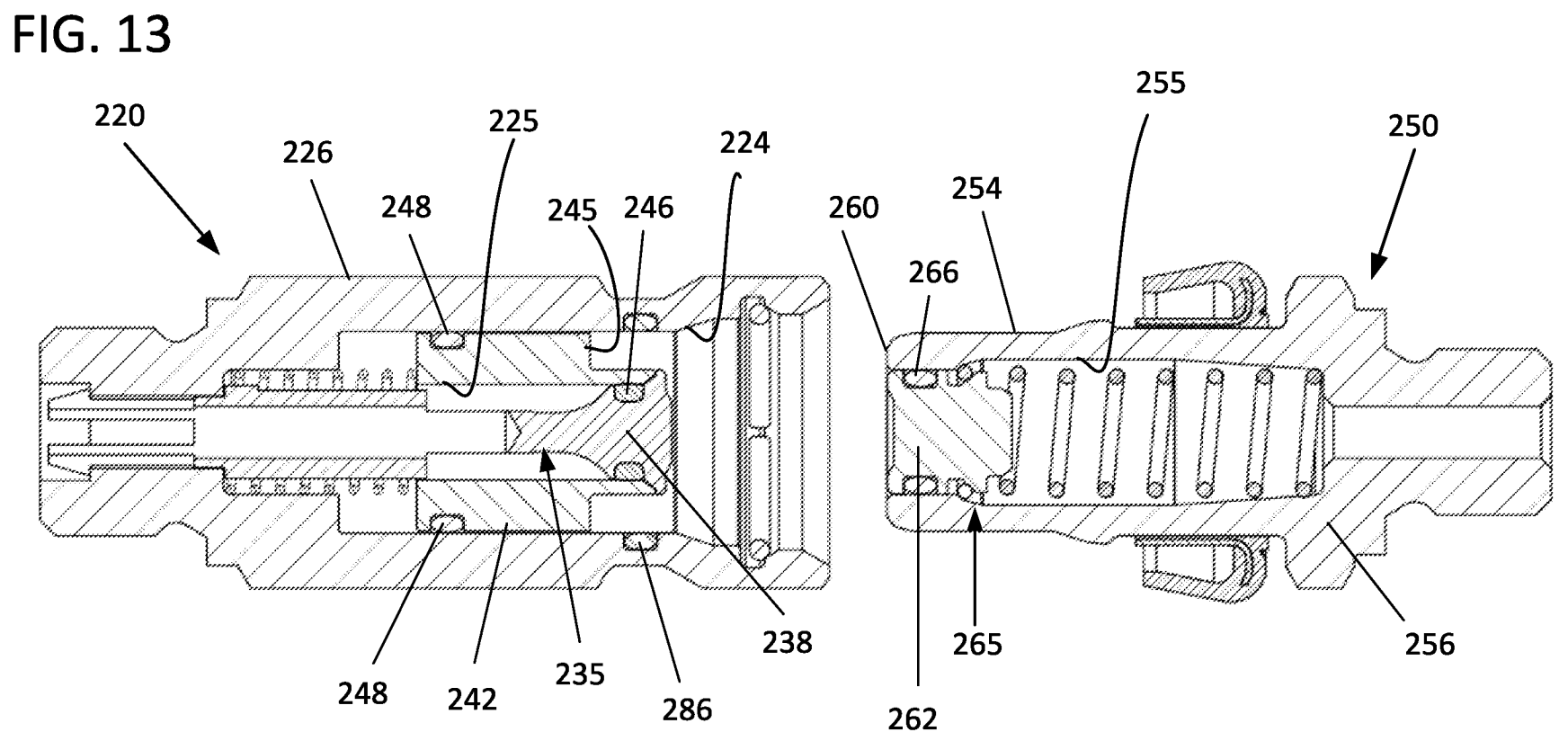

FIG. 13 shows an alternative implementation of the coupler arrangement 206 including another example socket connector 220 and another example plug connector 250. The socket connector 220 includes a body 226 defining a first passage 225 accessible through a cavity 224. The first passage 225 is selectively closed by a valve arrangement 235. The plug connector 250 includes a body 256 defining a second passage 255 selectively closed by a valve arrangement 265 at an end 260 of the body 256. The socket and plug connectors 220, 250 operate in substantially the same way as socket and plug connectors 120, 150, except as described below.

The socket connector 220 differs from the socket connector 120 of FIGS. 1-12 in the position of the seals of the first and second valve arrangements 235, 265 compared to the seals of first and second valve arrangements 135, 165. The seal 266 between the piston 262 and the plug body 256 of the second valve arrangement 265 of the plug connector 250 is carried by the piston 262 in FIG. 13. Mounting the seal 266 on the piston 262 may facilitate manufacturing the valve arrangement 265 compared to mounting the seal within the plug housing as shown in valve arrangement 165.

An additional seal 286 (e.g., an o-ring or gasket) is disposed within the cavity 224 of the socket connector housing 226 to seal against an exterior of the nose 254 of the plug connector body 256 when the plug connector 250 is inserted within the socket cavity 224. In certain examples, the seal 286 environmentally seals against the plug nose 254 before the second valve arrangement 265 is actuated (e.g., moved to the open position). In certain examples, the seal 286 environmentally seals against the plug nose 254 before the first valve arrangement 235 is actuated (e.g., moved to the open position).

In certain implementations, the second seal 248 of the socket connector 220 is carried by the valve sleeve 242 instead of being mounted within the socket connector body 226. The second seal 248 still provides an environmental seal between the valve sleeve 242 and the interior of the socket connector housing 226. However, mounting the second seal 248 on the valve sleeve 242 may facilitate manufacturing by allowing the second seal 248 to be mounted to an exterior of the valve sleeve 242 and then the valve sleeve 242 and seal 248 can be slid into the socket connector housing 226. Such mounting may be easier than attempting to mount the second seal within a groove within an interior of the socket connector housing 226. It will be understood that the change to the mounting location of the second seal of the socket connector can be used in conjunction with a plug connector having a seal 166 mounted within an annular groove disposed within the interior of the plug connector housing 156.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A coupling assembly, comprising:
   a plug connector including:
   a plug body extending along a first longitudinal axis between respective first and second ends, the plug body defining a first passage extending therethrough along the first longitudinal axis, the first end of the plug body being configured to receive a respective fluid line, the second end of the plug body defining an interface aperture leading to the first passage;
   a valve stopper disposed within the first passage to move towards and away from the interface aperture, the valve stopper being biased by a first spring towards the interface aperture to close the first passage at the interface aperture, the valve stopper having a first interface arrangement; and
   a release sleeve disposed at an exterior of the plug body at an intermediate position along the first longitudinal axis such that the valve stopper is not radially aligned with the release sleeve when closing the first passage; and
   a socket connector including:
   a socket body extending along a second longitudinal axis between respective first and second ends, the first end of the socket body being configured to receive a respective fluid line, the socket body defining a cavity at the second end and a second passage extending along the second longitudinal axis from the first end of the socket body and into the cavity, the second end of the socket body defining a port opening leading to the cavity, the cavity being sized to receive the second end of the plug body; and
   a valve arrangement disposed within the second passage, wherein the valve arrangement includes a valve stem and a valve sleeve, the valve sleeve extending along the second longitudinal axis from a first end of the valve sleeve towards a second end of the valve sleeve, the second end of the valve sleeve abutting the valve stem when the second passage is closed, the valve arrangement being biased by a second spring to close the second passage, the valve arrangement including a second interface arrangement complementary to the first interface arrangement of the valve stopper so that the valve stopper engages the valve arrangement without trapping air therebetween when the plug connector is received at the socket connector, wherein the plug connector and the socket connector are configured such that, when the plug connector is inserted through the second end of the socket connector to couple the plug connector and the socket connector together, the first spring and the second spring begin to compress at different times;

wherein the second end of the valve sleeve within the socket body is covered entirely by the valve stem when the valve arrangement is closed;

wherein the second spring abuts against a surface of the first end of the valve sleeve, the surface facing the first end of the socket body;

wherein the valve sleeve includes a flange extending radially away from the second longitudinal axis; and wherein a length of the valve sleeve from the flange to the second end of the valve sleeve is shorter than a length of the valve sleeve from the flange to the first end of the valve sleeve.

2. The coupling assembly of claim 1, wherein the release sleeve has an outermost cross-dimension that is sufficiently small to inhibit manual actuation of the release sleeve.

3. The coupling assembly of claim 2, wherein the release sleeve covers the second end of the socket body so that the second end of the socket body is disposed within a pocket of the release sleeve.

4. The coupling assembly of claim 1, wherein the release sleeve extends along part of the exterior of the plug body and along part of an exterior of the socket body when the plug connector is received at the socket connector.

5. The coupling assembly of claim 1, wherein the plug connector includes a stop feature that protrudes from the exterior of the plug body; and wherein the socket connector includes a resilient latch ring disposed within the cavity, the resilient latch ring being configured to expand while camming over the stop feature during insertion of the plug connector and to snap back to an initial size after clearing an apex of the stop feature.

6. The coupling assembly of claim 5, wherein the socket body defines an annular groove sized and positioned to accommodate expansion of the latch ring.

7. The coupling assembly of claim 5, wherein the release sleeve is configured to move relative to the plug body towards the stop feature to disconnect the plug connector from the socket connector.

8. The coupling assembly of claim 5, wherein the stop feature includes a shoulder having a camming surface facing at least partially towards the second end of the plug body and an abutting surface facing at least partially towards the first end of the plug body.

9. The coupling assembly of claim 1, wherein at least a third of the plug body is received within the cavity of the socket body.

10. The coupling assembly of claim 1, the valve stem being stationary relative to the socket body, the valve sleeve being movable towards and away from the port opening to close and open the valve arrangement, respectively, the valve sleeve being biased towards the port opening to close the second passage.

11. The coupling assembly of claim 1, wherein the plug connector and the socket connector are configured such that, when the plug connector is inserted through the second end of the socket connector to couple the plug connector and the socket connector together, the first spring compresses before the second spring compresses.

12. A coupling assembly, comprising:
a plug connector, including:
  a plug body extending along a longitudinal axis between respective first and second ends, the plug body defining a first passage extending therethrough along the longitudinal axis, the first end of the plug body being configured to receive a respective fluid line, the second end of the plug body defining an interface aperture leading to the first passage;
  a valve stopper disposed within the first passage to move towards and away from the interface aperture, the valve stopper being biased by a spring towards the interface aperture to close the first passage at the interface aperture, the spring being positioned within the first passage and surrounding an outer surface of the valve stopper, a first portion of the spring being positioned within a notch on the outer surface of the valve stopper; and
  a stop feature disposed at an exterior of the plug body, the stop feature being spaced along the longitudinal axis from the valve stopper when the valve stopper closes the first passage, the stop feature including a camming surface tapering radially outwardly from the plug body as the camming surface extends along the longitudinal axis towards the first end of the plug body, the stop feature also defining an abutment surface tapering radially inwardly as the abutment surface extends along the longitudinal axis toward the first end of the plug body, the abutment surface having a steeper slope than the camming surface; and
a socket body extending along a second longitudinal axis and including a valve sleeve, the valve sleeve having a first end and a second end, wherein the first end of the plug body is configured to be received within the socket body;

wherein a second spring abuts against a surface of the first end of the valve sleeve, the surface facing a first end of the socket body;

wherein the valve sleeve includes a flange extending radially away from the second longitudinal axis of the socket body; and wherein a length of the valve sleeve from the flange to the second end of the valve sleeve is shorter than a length of the valve sleeve from the flange to the first end of the valve sleeve.

13. The coupling assembly of claim 12, further comprising a release sleeve mounted at an exterior of the plug body at a longitudinal midpoint of the plug body.

14. A socket connector comprising:
a socket body extending along a longitudinal axis between respective first and second ends, the first end of the socket body being configured to receive a respective fluid line, the socket body defining a cavity at the second end and a second passage extending along the longitudinal axis from the first end of the socket body and into the cavity, the second end of the socket body defining a port opening leading to the cavity, the cavity being sized to receive a second end of a plug body; and
a valve arrangement disposed with the cavity and configured to selectively close and open the second passage, the valve arrangement including a valve stem that is fixed relative to the socket body and a valve sleeve that moves relative to the valve stem and slides within the socket body, the valve sleeve extending along the longitudinal axis from a first end of the valve sleeve towards a second end of the valve sleeve, the second end of the valve sleeve abutting the valve stem when the second passage is closed, the valve sleeve including a flange extending radially away from the longitudinal axis, the flange being offset along the longitudinal axis from the second end of the valve sleeve and configured to contact the second end of the plug body to slide the valve sleeve within the second passage to open the second passage, wherein the second end of the valve sleeve is covered entirely by the valve stem when the valve arrangement is closed;

wherein a spring abuts against a surface of the first end of the valve sleeve, the surface facing the first end of the socket body; and wherein a length of the valve sleeve from the flange to the second end of the valve sleeve is shorter than a length of the valve sleeve from the flange to the first end of the valve sleeve.

15. The socket connector of claim 14, further comprising a locking arrangement disposed within the cavity at a location spaced along the longitudinal axis from the valve arrangement towards the port opening, the locking arrangement being accessible only within an interior of the cavity, wherein the locking arrangement includes a region of the cavity defining an annular groove and an abutment surface, the locking arrangement also including a latch ring retained within the region, the latch ring being movable along the longitudinal axis between the annular groove and the abutment surface, the latch ring being resiliently expandable within the annular groove.

* * * * *

14